UNITED STATES PATENT OFFICE.

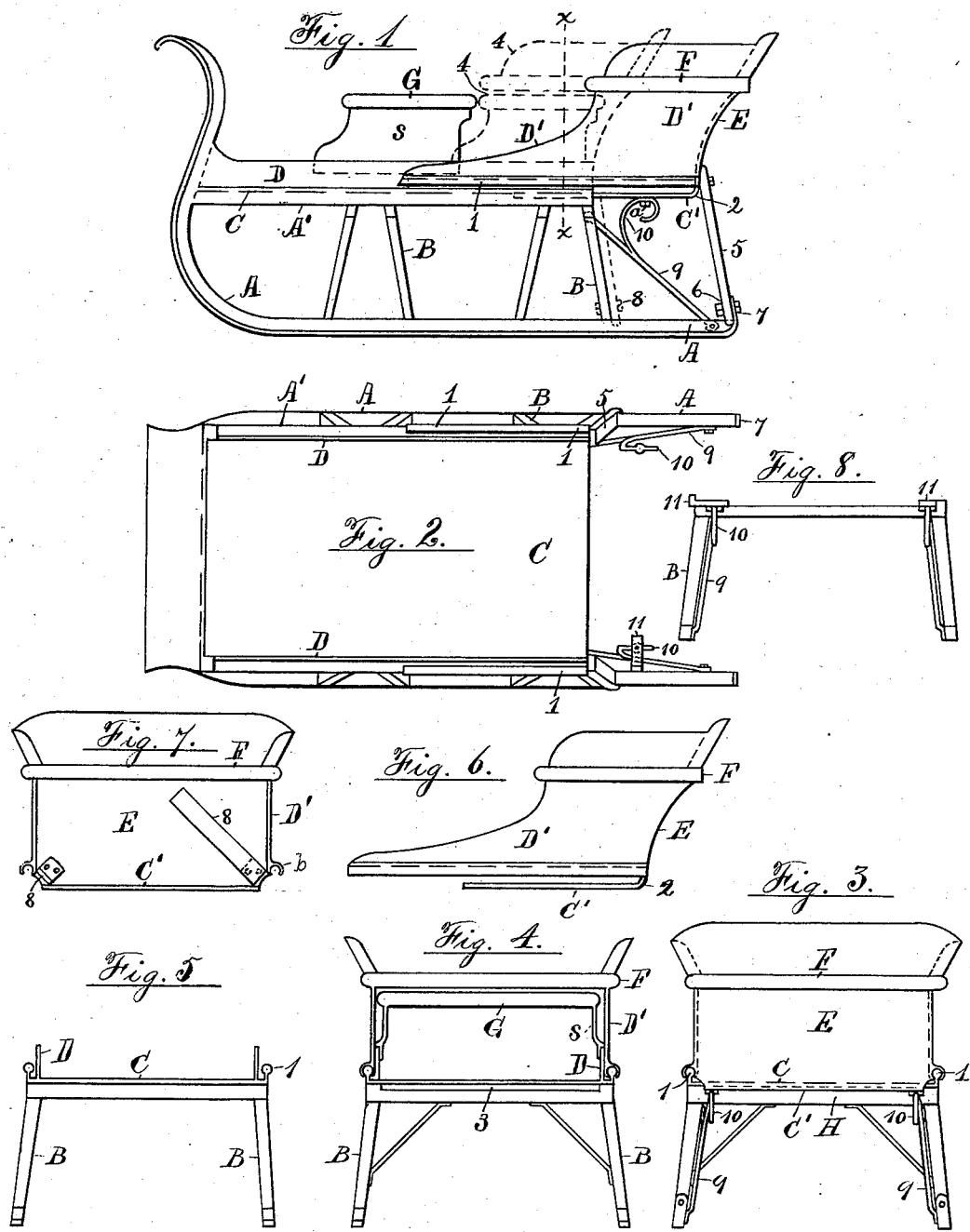

WILLIAM A. COMPTON, LIBERTY CORNER, NEW JERSEY.

SLEIGH.

SPECIFICATION forming part of Letters Patent No. 286,784, dated October 16, 1883.

Application filed October 27, 1882. (No model.)

*To all whom it may concern:*

Be it known that I, WILLIAM A. COMPTON, a citizen of the United States, residing in the town of Liberty Corner, in the county of Somerset and State of New Jersey, have invented certain new and useful Improvements in Sleighs, fully described and represented in the following specification and the accompanying drawings, forming a part of the same.

My invention consists in such a construction of a sleigh-body that the same is capable of being pulled out or extended bodily, the rear thereof having a bottom and sides entirely distinct from those of the front part, and the bottoms being made to lap over or slide past one another when the body is closed up for use with one seat. Two seats are provided for use when the body is extended by pulling out the rear part; but as such combinations of seats are old, I have not claimed them specifically. For convenience I have designated that part of the body which is permanently attached to the runners as the "fixed body," and the movable sides, bottom, and seat as the "movable body."

It is plain that my invention is especially applicable to a sleigh, as the runners may be easily extended toward the rear, and afford a support for the extended or movable body when pulled out.

The nature of my invention will be understood by reference to the annexed drawings, in which Figure 1 is a side elevation of a sleigh provided with my improvements and arranged for use with two seats, and having the relation of the parts, when adapted for one seat, indicated by dotted lines. Fig. 2 is a plan of the same arranged for one seat. Fig. 3 is a view at the rear end of the sleigh, as shown in Fig. 1. Fig. 4 is a cross-section at line $x\,x$ in Fig. 1. Fig. 5 is a cross-section of a similar character, showing the construction for the rails or guides for the extension part of the body. Fig. 6 is a side view, and Fig. 7 is a front view, of the extension-body detached from the sleigh. Fig. 8 is a rear view of the stationary body.

A A' are the runners and frame of the sleigh, and B the knees or inclined braces connecting the frame and runners.

C is the platform or floor, which, with the two side-boards D, constitutes the fixed body of the sleigh. The side-boards may be made of any desired height or pattern, but are shown in the drawings as parallel pieces, extending along just inside the edge of the floor C to the rear end of the latter. A metallic rail with a round head is attached at the side edges of the floor about one-half the length from the rear toward the front, and the sides of the movable body are constructed with sockets $b$, to fit over the rails and rest thereon at their lower edges.

The movable body consists of the back E, seat F, and bottom C', united to the two sides D', which latter extend along the tops of the rails 1, so as to cover the same when the body is pulled back, as shown in Fig. 1 in the full lines. The rails are thus never uncovered, and their existence is only indicated by the shape given to the bottom edges of the movable sides. The bottom C' is connected to the movable body only at the rear end, as at 2 in Figs. 1 and 6, and its free end extends under the main floor C through a slot, 3, formed in or over the rear bolster, H, as at Fig. 4. The loose end of the movable bottom therefore rests on the said bolster when the body is extended, and the slits or openings between the bottom C' and sides D' are covered by flaps 8, hinged to the back beneath the seat F, as shown in dotted lines in Fig. 1. One of these flaps is shown turned up at the right-hand side of Fig. 7, and at the left-hand side turned down, as if resting upon the floor C', in the manner it is arranged to be used. The front or movable seat is shown at G in Fig. 1, constructed with supports $s$ at each end, resting upon the top of the side-boards D, so that it may be slid under the rear seat, F, at pleasure.

The movable parts, when pulled back, furnish a rear seat to the sleigh, while the loose seat G, being pushed forward, forms a front seat, as shown in Fig. 1, thus forming a two-seated sleigh, as desired, which can be converted into a single-seated vehicle by pushing the movable parts in and placing the seat G under the seat F, as indicated by the dotted lines 4 in Fig. 1. To support the rear seat when pulled out, as well as the weight of the sitter and the other movable parts, two knees, 5, are secured at the lower corners of the back E and extended down to a contact with the runners A, which are sufficiently extended to receive them when the parts C′, D′, and E are extended. When pushed in, the knees 5 lie against the rear knees, B, and when pulled back their lower ends, 6, fit against the upturned ends of the inner irons, as at 7 in Fig. 1. A bolt and nut inserted through the knee at 7 suffice to make the parts rigid when extended, and the same bolt may be used, as at 8, to hold the knees 5 and B together when the body is closed up to use with one seat. A brace, 9, is also shown secured to the inside of each runner A, at its rear end, and carried to the top of the rear knee, B. The runner A is thus stiffened at that point, and an additonal brace is provided for the extended body by carrying a branch, 10, from the brace 9 up to the lower side of the bottom C′, where it is secured by a bolt, a.

It will be seen from the above that my invention consists in cutting the body transversely into two parts and adapting the rear one to slide to and from the other, as described.

I am aware that different combinations of seats and attachments to a single fixed body have been made to effect the same object as my invention, and I do not therefore claim, broadly, the principle of converting a vehicle from one to two seated. Thus in United States Patent No. 214,547 a buggy is shown having the front portion capable of being raised up on hinged links and swung forward to lengthen the body, and in other patents, as Nos. 20,127 and 134,452, various forms of sliding seats are shown. I therefore disclaim such constructions and the principle embodied in them, and consider my invention to differ from them in the features herein claimed.

In Fig. 8 is shown another construction for supporting the extended body on the top of the braces 10, consisting in riveting buttons 11 upon the top of the brace at such a level that the bottom C′ will just slide over the tops of the buttons. One of the latter is shown secured to the top of the brace 10 in nearer side of Fig. 2, the same being turned crosswise of the brace, as at the left side of Fig. 8. In this position the button rests crosswise in contact with the under side of bottom C′, and gets an extended bearing thereon, while it may be turned lengthwise of the brace when not in use, as in the view of the brace and button at the right side of Fig. 8. The button shown at the left side of same figure has a stud or projection formed at its outer or left end, the same being intended to fit under the rail-sockets b and support the latter, as well as the comparatively yielding bottom C′. The methods of uniting the wooden and iron parts in such constructions being well known, I have not shown all the fastenings and connections required herein. In place of the bolt shown at 7 or 8 in Fig. 1, the foot of the knee 5 may be formed with a threaded projection, extending toward the upturned end of the runner at 7 and passed through a hole in it, like the bolt shown. The runner may also be made with a hinge in the part projecting in the rear of the fixed body, so that one-half of such runner can be bent up toward the rear knee, B, when not required to support the extension-body.

Having shown the nature of my construction, I claim the same in the following manner:

1. The sleigh-body divided transversely into fixed and movable parts, the fixed part consisting of the runners A A′, knees B, platform C, and side-boards D, constructed substantially as described, and the movable part, consisting of the sides D′, bottom C′, and seat F, the two parts being constructed and arranged to slide, with the sides and bottoms overlapping when closed together, and the movable part being supported, substantially as shown and described, when pulled out or extended.

2. The combination, with the braces 9 on the main body and the extension-bottom C′ on the movable body, of the branches 10, for supporting the movable bottom from the braces 9, as herein shown and described.

3. The combination, with the movable body and its bottom C′, arranged to slide under the fixed bottom C, as described, of the flaps 8, hinged under the movable seat, and operated substantially as and for the purpose set forth.

In testimony whereof I have hereunto set my hand in the presence of two subscribing witnesses.

WILLIAM A. COMPTON.

Witnesses:
W. F. D. CRANE,
THOS. S. CRANE.